(12) United States Patent
Jonas et al.

(10) Patent No.: US 10,594,231 B2
(45) Date of Patent: Mar. 17, 2020

(54) MOTOR STARTER, OPERATING METHOD, COMPUTER PROGRAM PRODUCT AND MOTOR STARTER ARRANGEMENT

(71) Applicant: Siemens Aktiengesellschaft, München (DE)

(72) Inventors: Stephan Jonas, Neunburg (DE); Peter Käsbauer, Schwandorf (DE); Norbert Reichenbach, Amberg (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 0 days.

(21) Appl. No.: 16/224,283

(22) Filed: Dec. 18, 2018

(65) Prior Publication Data

US 2019/0190406 A1  Jun. 20, 2019

(30) Foreign Application Priority Data

Dec. 19, 2017 (DE) ........................ 10 2017 223 250

(51) Int. Cl.
*H02P 1/24* (2006.01)
*H01H 9/54* (2006.01)
*H01H 50/54* (2006.01)
*H01H 50/64* (2006.01)
*H01H 1/20* (2006.01)
(Continued)

(52) U.S. Cl.
CPC ............. *H02P 1/24* (2013.01); *H01H 1/2016* (2013.01); *H01H 9/542* (2013.01); *H01H 50/546* (2013.01); *H01H 50/645* (2013.01); *H02P 1/26* (2013.01); *H02P 1/46* (2013.01); *H01H 2201/026* (2013.01); *H01H 2235/016* (2013.01)

(58) Field of Classification Search
CPC ........ H01H 33/00; H01H 9/541; H01H 79/00; H03K 17/08; H02J 2007/0039; H02P 1/00; H02P 1/023; H02P 1/04; H02P 1/06; H02P 1/08; H02P 1/24; H02P 1/26; H02P 1/46; H02P 1/42; H02P 3/00; H02P 3/18; H02P 25/18; H02P 27/04; H02P 27/06; H02P 23/00; H02P 27/00; H02P 29/027
USPC ... 361/2, 3, 5, 6, 7, 14, 20, 22, 23, 31, 91.8, 361/211, 289; 123/179.25; 180/270; 200/5 F, 82 DA; 307/10.6
See application file for complete search history.

(56) References Cited

U.S. PATENT DOCUMENTS 3,775,576 A    11/1973  Brown
4,525,762 A *   6/1985  Norris .................... H01H 9/542
                                                   307/134
(Continued)

FOREIGN PATENT DOCUMENTS

DE    3137321 A1    4/1983
DE    3718634 A1   12/1987
(Continued)

*Primary Examiner* — Antony M Paul
(74) *Attorney, Agent, or Firm* — Henry M. Feiereisen LLC

(57) ABSTRACT

A motor starter for operating an electric motor connected to a multiphase power supply includes a semiconductor switch arranged in a current-carrying phase of the multiphase power supply, and an electromechanical switch arranged in parallel relation to the semiconductor switch in the current-carrying phase. The electromechanical switch includes a movable switching piece configured tiltable to reduce a current gradient in the semiconductor switch.

18 Claims, 4 Drawing Sheets

(51) Int. Cl.
*H02P 1/26* (2006.01)
*H02P 1/46* (2006.01)

(56) References Cited

U.S. PATENT DOCUMENTS

| | | | | |
|---|---|---|---|---|
| 4,709,294 | A | * | 11/1987 | Kim ................... H01H 9/542 |
| | | | | 361/58 |
| 4,802,051 | A | | 1/1989 | Kim |
| 6,586,905 | B1 | | 7/2003 | Johnson |
| 6,624,989 | B2 | * | 9/2003 | Brooks, Jr. ............ H01H 9/542 |
| | | | | 361/3 |
| 7,542,250 | B2 | * | 6/2009 | Premerlani ........ H01H 59/0009 |
| | | | | 361/1 |
| 8,258,738 | B2 | * | 9/2012 | Andrews, Jr. ............. H02P 1/42 |
| | | | | 318/786 |
| 9,076,607 | B2 | * | 7/2015 | Premerlani .......... H01H 1/0036 |
| 2002/0092756 | A1 | | 7/2002 | Sato |
| 2018/0122612 | A1 | | 5/2018 | Koepf et al. |

FOREIGN PATENT DOCUMENTS

| | | |
|---|---|---|
| DE | 102013111954 A1 | 4/2015 |
| DE | 102015212802 A1 | 1/2017 |
| EP | 0343390 A2 | 11/1989 |
| EP | 2320535 A1 | 5/2011 |

* cited by examiner

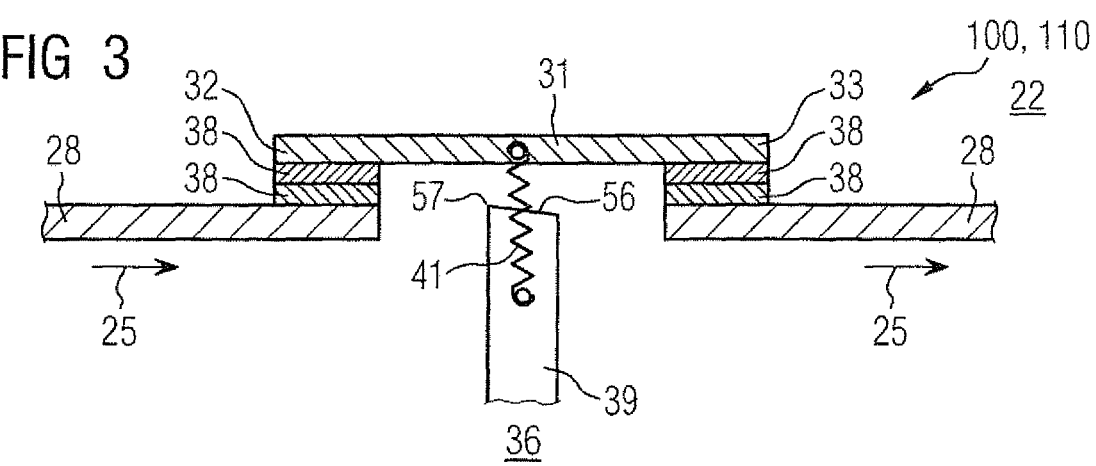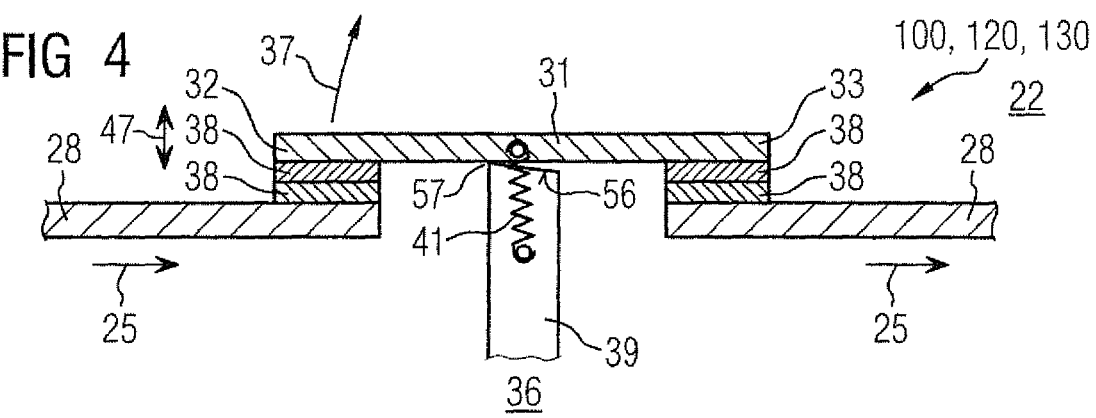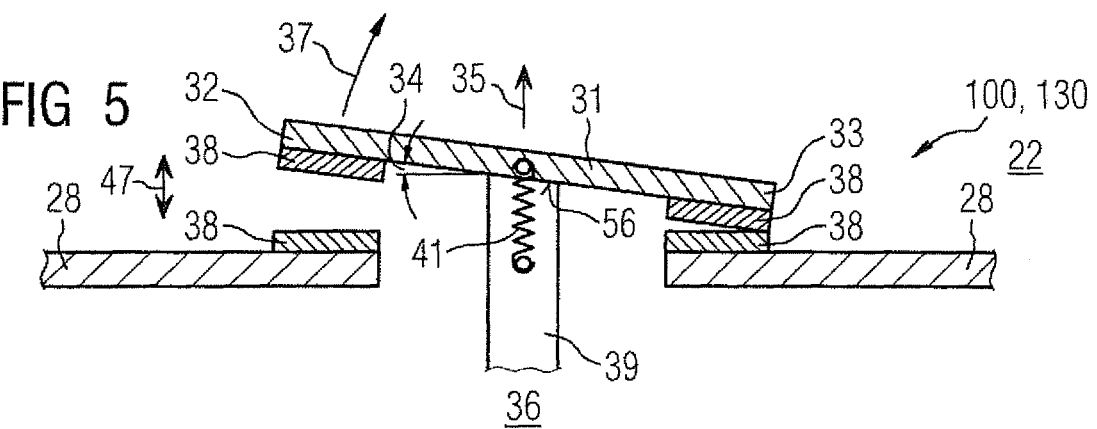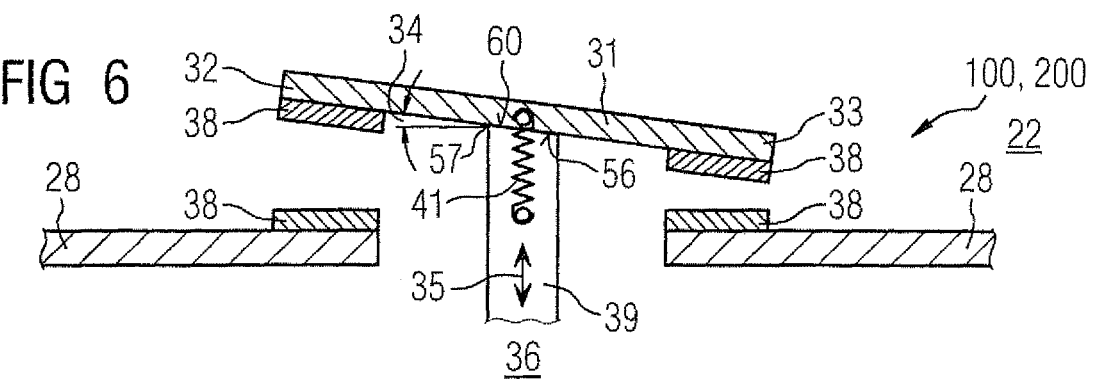

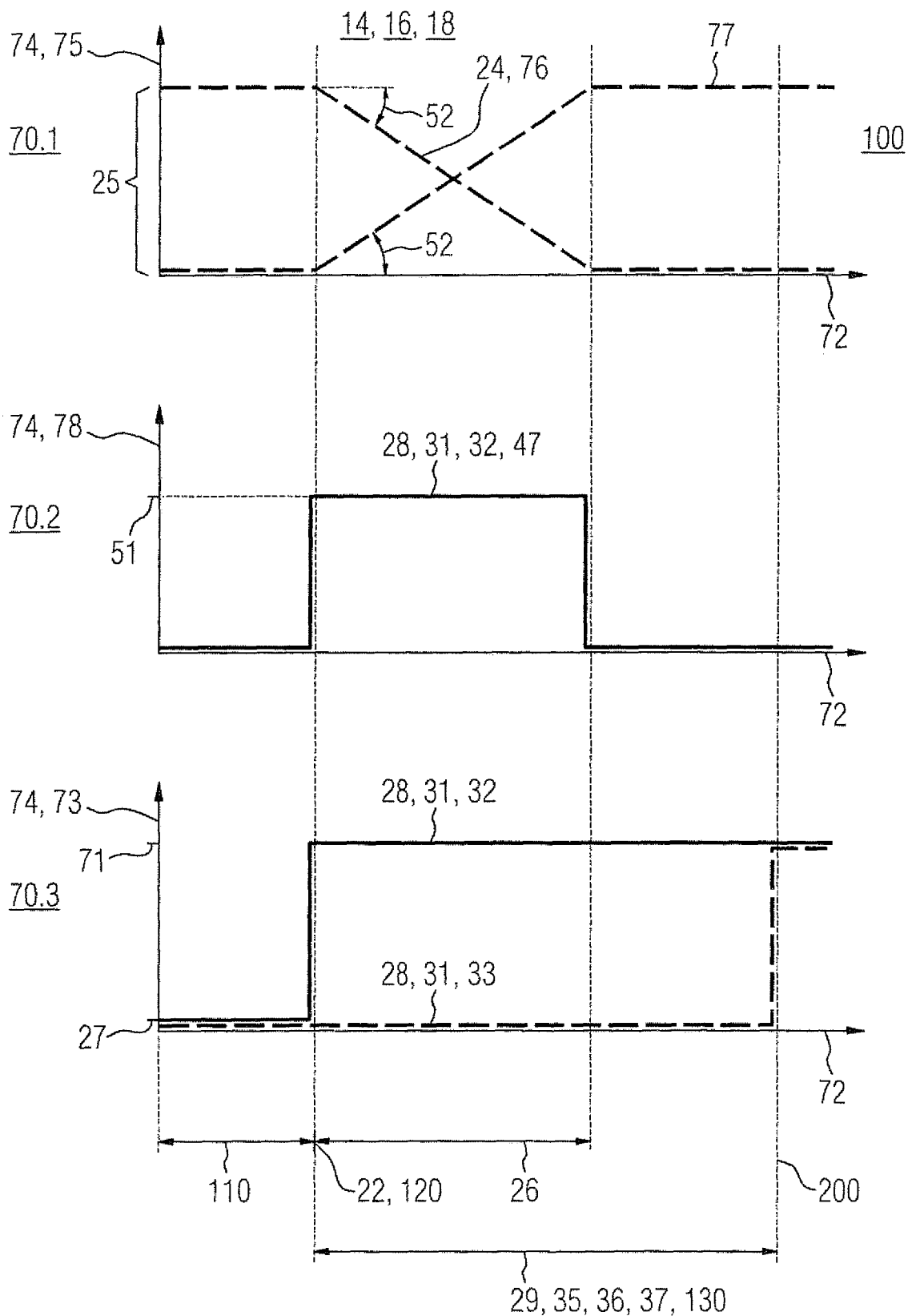

MOTOR STARTER, OPERATING METHOD, COMPUTER PROGRAM PRODUCT AND MOTOR STARTER ARRANGEMENT

CROSS-REFERENCES TO RELATED APPLICATIONS

This application claims the priority of German Patent Application, Serial No. 10 2017 223 250.1, filed Dec. 19, 2017, pursuant to 35 U.S.C. 119(a)-(d), the disclosure of which is incorporated herein by reference in its entirety as if fully set forth herein.

BACKGROUND OF THE INVENTION

The present invention relates to a motor starter for an electric motor and an operating method for such a motor starter. The invention also relates to a computer program product embodied to implement the operating method. The invention further relates to a motor arrangement to which a corresponding motor starter belongs.

The following discussion of related art is provided to assist the reader in understanding the advantages of the invention, and is not to be construed as an admission that this related art is prior art to this invention.

In the field of automation, there is a requirement for motor starters for electric motors that are compact and can be produced in a simple and economic manner.

It would therefore be desirable and advantageous to address these problems and to obviate other prior art shortcomings.

SUMMARY OF THE INVENTION

According to one aspect of the present invention, a. motor starter for operating an electric motor connected to a multiphase power supply includes a semiconductor switch arranged in a current-carrying phase of the multiphase power supply, and an electromechanical switch arranged in parallel relation to the semiconductor switch in the current-carrying phase, the electromechanical switch including a movable switching piece configured tiltable to reduce a current gradient in the semiconductor switch.

In accordance with the present invention, the motor starter includes a semiconductor switch that is embodied to interrupt the current flow in the corresponding phase. Herein, the semiconductor switch can, for example, be embodied as an antiparallel pair of thyristors. Arranged parallel to the semiconductor switch, there is an electromechanical switch that is embodied to interrupt a current flow in the corresponding phase. The electromechanical switch and the semiconductor switch bridge one another so that the current flow in the phase is interrupted when the semiconductor switch and the electromechanical switch are open. In this way, the semiconductor switch and the associated electromechanical switch together form a bypass circuit.

The at least one electromechanical switch is embodied, when a stationary operating state is reached, in particular a continuous operation of the electric motor, to accept and conduct the entire current flow flowing through the semiconductor switch. In a stationary operating state, the electromechanical switch generates less heat loss than the semiconductor switch. This makes it possible to dispense with large and expensive cooling facilities for the claimed motor starter.

The at least one electromechanical switch of the motor starter includes a switching piece that is embodied as movable. The current flow through the electromechanical switch can be established produced in that the switching piece is moved into a position in which it contacts two opposing stationary contacts. An interruption of the current flow is initiated by the switching piece if at least one end is not in contact with the associated stationary contact, i.e. the electric contacting is no longer complete.

According to the invention, the switching piece is embodied as tiltable. This enables sequential contacting of the two stationary contacts on closing of the electromechanical switch, and, on an opening, a sequential detachment of the switching piece from the stationary contacts. If on the actuation of the switching piece, in particular on an opening, the switching piece is only in contact with one stationary contact, there is a reduced arc voltage between the free end of the switching piece and the corresponding stationary contact. Herein, a reduced arc voltage should be understood to be an arc voltage corresponding to that of a single contact opening path. Compared with a case in which both ends of the switching piece are simultaneously detached from their stationary contacts, such as would occur with a non-tiltable switching piece, the arc voltage can be substantially halved compared to the solutions known in the prior art. The higher the arc voltage that occurs, the higher the commutation velocity and correspondingly the lower the commutation period. In particular, there is a substantially linear relationship between these variables. Hence, the reduced arc voltage across the mechanical switch results in a reduced current gradient in the parallel semiconductor switch. Herein, a current gradient should be understood as a change to the present current intensity based on the time. The higher the arc voltage, the higher the current gradient in the semiconductor switch. A reduced current gradient means reduced stress for a semiconductor switch. This results in less wear of the semiconductor switch and also reduced risk of the semiconductor switch failing, i.e. greater reliability and a longer lifetime.

A further variable that determines the current gradient in the semiconductor switch is the inductance present in the electromechanical switch—the semiconductor switch arrangement, which is also called commutation inductance. The higher the commutation inductance, the lower the current gradient in the semiconductor switch. A high commutation inductance is achieved by a corresponding long length of the lines connecting the semiconductor switch and the electromechanical switch to one another. Hence, the tiltable switching piece enables the lengths of the lines connecting the semiconductor switch and the electromechanical switch to be reduced. This in turn enables the semiconductor switch and the electromechanical switch to be positioned closer to one another, which in turn saves on material and space. The tiltable switching piece can be produced in a simple and economic matter and offers a high degree of reliability. Hence, the solution according to the invention enables the stress on semiconductor switches to be reduced and a more space-saving construction to be achieved.

According to another advantageous feature of the present invention, the electromechanical switch can be configured such that the current gradient in the semiconductor switch is reduced, when the electromechanical switch opens. The current flow in the corresponding phase initially takes place hereby entirely across the electromechanical switch. An opening of the electromechanical switch initiates commutation to the semiconductor switch. Herein, the arc voltage present with such a commutation at the first end of the switching piece represents a determinant variable for the current gradient that occurs in the semiconductor switch. The tiltable switching piece causes the sequential detachment of the ends of the switching piece from the associated stationary contacts resulting in reduced arc voltage during the commutation process. This avoids elevated current gradients and hence reduces stress on the semiconductor switch to a significant degree.

According to another advantageous feature of the present invention, the electromechanical switch can have stationary contacts, the switching piece having first and second ends interacting with the stationary contacts, respectively, such that, when the electromechanical switch opens, an actuation period can be defined between a detachment of the first end from the one of the stationary contacts and a detachment of the second end from the other one of the stationary contacts, which actuation period exceeds a commutation period for the semiconductor switch. The actuation period thus exceeds a commutation period for the semiconductor switch arranged parallel to the respective electromechanical switch. As a result, during the actuation period and the detachment of the end of the switching piece from the associated stationary contact, the arc voltage at the second end of the switching piece is substantially zero. As result, this in turn ensures a particularly gentle change-over of the current flow from the electromechanical switch to the semiconductor switch. This achieves the advantages of the invention to an extensive degree.

According to another advantageous feature of the present invention, the switching piece can be connected tiltably to a switching-piece carrier having an inclined stop for tilting the switching piece. On an actuation, in particular an opening, the switching piece is brought into a tilted position by the inclined end of the switching-piece carrier. Alternatively or supplementarily, the switching-piece carrier can have a spring element that is embodied to apply preloading to the switching piece. The spring element causes the switching piece to be embodied to adopt a tilted position in an open state. Further alternatively or supplementarily, the switching piece can also be connected in an eccentric manner to the switching-piece carrier. The eccentric connection to the switching-piece carrier causes the switching piece in open state to be held in a tilted position by its own weight and/or the spring element. Instead or additionally, the motor starter can include a wall on which a projection is embodied, which, on actuation, presses on the tiltable switching piece and hence moves it into a tilted position. This is achieved by unilateral support of the switching piece. Herein, the outlined technical embodiments of the switching piece can occur individually or in combination. As a result, the tiltable contact can be implemented in a plurality of structural variations that can be produced in a simple and cost-effective manner. Hence, the claimed solution can be implemented in the form of retrofitting in numerous existing motor starters.

According to another advantageous feature of the present invention, the switching-piece carrier can be configured to enable adjustment of the actuation period as a function of an actuation velocity of the switching-piece carrier and/or a maximum tilt angle of the switching piece. The higher the maximum tilt angle of the switching piece, the longer the actuation period. The higher the actuation velocity, the shorter the actuation period. For example, a high maximum tilt angle enables a long actuation period to be achieved even with a high actuation velocity. This ensures a high degree of design freedom in that the claimed solution can be implemented in an advantageous form. This makes it possible to dispense with extensive modifications and adaptations, for example of existing electromagnetically operated mechanisms in electromechanical switches. Hence, this means the claimed solution can be implemented in a simple manner.

The electromechanical switch and the semiconductor switch can be electrically connected to one another and thus form a commutation circuit. The commutation circuit has a commutation inductance resulting from the inductances of the lines connecting the semiconductor switch to the electromechanical switch. The commutation inductance can be between 20 nH and 150 nH. Currently preferred is a commutation inductance between 30 nH and 120 nH. Such a low commutation inductance is associated with a lower length so that the semiconductor switch and the electromechanical switch can be positioned close to one another. This achieves a high degree of space saving.

According to another advantageous feature of the present invention, a contact piece can be arranged at each of the first and second ends of the switching piece. Since, with a tiltable switching piece, during the actuation period, the arc voltage at the second end is substantially zero, use of an inexpensive and easily available material becomes possible. The contact piece at the second end of the switching piece can, for example, be made of copper or a copper alloy. Moreover, herein, it is advantageously possible to utilize the higher conductivity of copper or copper alloys compared to known silver-based materials. In addition, the switching piece can be embodied in one piece with the contact piece at the first and/or second end. Similarly to the switching piece, at least one of the stationary contacts can be provided with a corresponding contact piece and also be embodied in one piece therewith.

According to another aspect of the present invention, a method of operating a motor starter having an electromechanical switch and a parallel semiconductor switch in a current-carrying phase of a multiphase power supply, includes in an operating state closing the electromechanical switch and opening the semiconductor switch, closing the semiconductor switch, and opening the electromechanical switch by detaching a first and a second end of a switching piece of the electromechanical switch from assigned stationary contacts, thereby reducing a current gradient in the semiconductor switch as a result of a tilting movement of the switching piece.

The motor starter is connected to a multiphase power supply and an electric motor. An electromechanical switch and a semiconductor switch parallel thereto are arranged in at least one of the current-carrying phases. The semiconductor switch is for example embodied as an antiparallel pair of thyristors. The semiconductor switch and the electromechanical switch bridge one another. A current flow through the corresponding phase is interrupted when the semiconductor switch and the electromechanical switch are simultaneously open. In a first step, the method according to the invention commences from an operating state in which the entire current flow in the corresponding phase completely passes through the electromechanical switch. In this starting state, the semiconductor switch is open. In a second step, the semiconductor switch is closed. In a subsequent third step, the electromechanical switch is opened by an actuation of a switching piece belonging to the electromechanical switch. The actuation causes a detachment of a first end of the switching piece from an associated stationary contact and the detachment of a second end of the switching piece from an associated stationary contact. Herein. first, the first end of the switching piece becomes detached from the corresponding stationary contact, then the second end of the switching piece becomes detached from the associated stationary contact. On the detachment of the first and second end of the switching piece, there is a tilting movement of the switching piece which is induced mechanically by the actuation. The tilting movement of the switching piece ensures the sequential detachment of the first and second end from the stationary contacts. As a result of the tilting movement, on the detachment of the first and second end, there is a reduced arc voltage between the switching piece and the corresponding stationary contact. The reduced arc voltage ensures a reduced current gradient in the semiconductor switch arranged in parallel. The reduced current gradient in the semiconductor switch means it is exposed to less stress and hence reduced wear. This increases the reliability and lifetime of the semiconductor switch.

According to another advantageous feature of the present invention, an actuation period which passes between detachment of the first and second ends of the switching piece from the assigned stationary contacts exceeds a commutation period for the semiconductor switch. Since, after the end of the commutation process, the current is entirely conducted by the semiconductor switch, the mechanical switch is current-free from this time. As a result, on the detachment of the second switching-piece end from the associated stationary contact, an arc voltage of substantially zero occurs. Hence, the current gradient in the semiconductor switch is also minimized on the detachment of the second end of the switching piece from the stationary contact. This further permits the use of a simpler and more cost effect material for a contact piece at the second end of the switching piece. In particular, this enables silver-based materials for the contact piece at the second end to be replaced. The contact piece at the second end can, for example, be made of copper or a copper alloy.

The actuation period can inter alia be defined by an actuation velocity of a switching-piece carrier on which the switching piece is arranged tiltably. Similarly, the actuation period can be defined by a maximum tilt angle that can be adopted by the switching piece. The higher the maximum tilt angle, the longer the actuation period. The higher the actuation velocity, the shorter the actuation period. Hence, the claimed method can be implemented in a simple manner in a wide corridor of construction parameters. As a result, the claimed method can be implemented in numerous motor starters and can, for example, also be implemented within the context of a retrofitting process.

According to still another aspect of the present invention, a computer program product is embodied in a non-transitory computer readable medium, wherein the computer program, when loaded into a control unit assigned to the motor starter and executed by the control unit, causes the control unit device to output an actuation command to a semiconductor switch and an electromechanical switch of a motor starter and to perform the steps of in an operating state closing the electromechanical switch and opening the semiconductor switch, closing the semiconductor switch, and opening the electromechanical switch by detaching a first and a second end of a switching piece of the electromechanical switch from assigned stationary contacts, thereby reducing a current gradient in the semiconductor switch as a result of a tilting movement of the switching piece.

The computer program product can be configured as software and/or be present in hard-wired form, for example as a chip, in particular as an application-specific integrated circuit, ASIC for short. According to the invention, the computer program product is embodied to implement an operating method in a motor starter, as described above. The computer program product is further configured to receive method parameters, for example by a user input or a higher-ranking control system, such as, for example, programmable logic controller, PLC for short. A further higher-ranking controller can also be a parameterizing device. Herein, method parameters are any adjustable variables that influence the course of the claimed operating method. This can, for example, be an intensity of a starting current of a magnetically operated mechanism by means of which the actuation velocity of a switching piece in the motor starter can be adjusted. The computer program product is suitable for storage and execution in an internal control unit arranged in the motor starter or in an external higher-ranking control unit. Similarly, the computer program product can be functionally divided for storage and execution as a system of a plurality of sub-programs on the internal control unit in the motor starter and the higher-ranking control system.

According to yet another aspect of the present invention, a motor arrangement, includes a multiphase power supply, a motor starter connected to the multiphase power supply, the motor starter including a semiconductor switch arranged in a current-carrying phase of the multiphase power supply, and an electromechanical switch arranged in parallel relation to the semiconductor switch in the current-carrying phase, the electromechanical switch including a movable switching piece configured tiltable to reduce a current gradient in the semiconductor switch, and an electric motor coupled to the multiphase power supply via the motor starter.

The motor starter enables targeted starting and braking and a defined continuous operation. To this end, the motor starter is embodied according to one of the embodiments outlined above. The motor starter arrangement can additionally include a higher-ranking control system, for example an PLC or a parameterizing device coupled to a control unit of the motor starter via a data connection. A motor starter arrangement of this kind enables a permanently reliable operation of the electric motor.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 3 is a schematic view of an electromechanical switch in a first step of an an operating method according to the present invention;

FIG. 4 is a schematic view of the electromechanical switch in FIG. 3 between second and third steps of the operating method;

FIG. 5 is a schematic view of the electromechanical switch in FIG. 4 during the third step of the operating method;

FIG. 6 is a schematic view of the electromechanical switch in FIG. 5 in a final state of the operating method; and FIG. 7 are schematic diagrams of the course of the operating method according to FIG. 3 to FIG. 6.

DETAILED DESCRIPTION OF PREFERRED EMBODIMENTS

Figure 1:
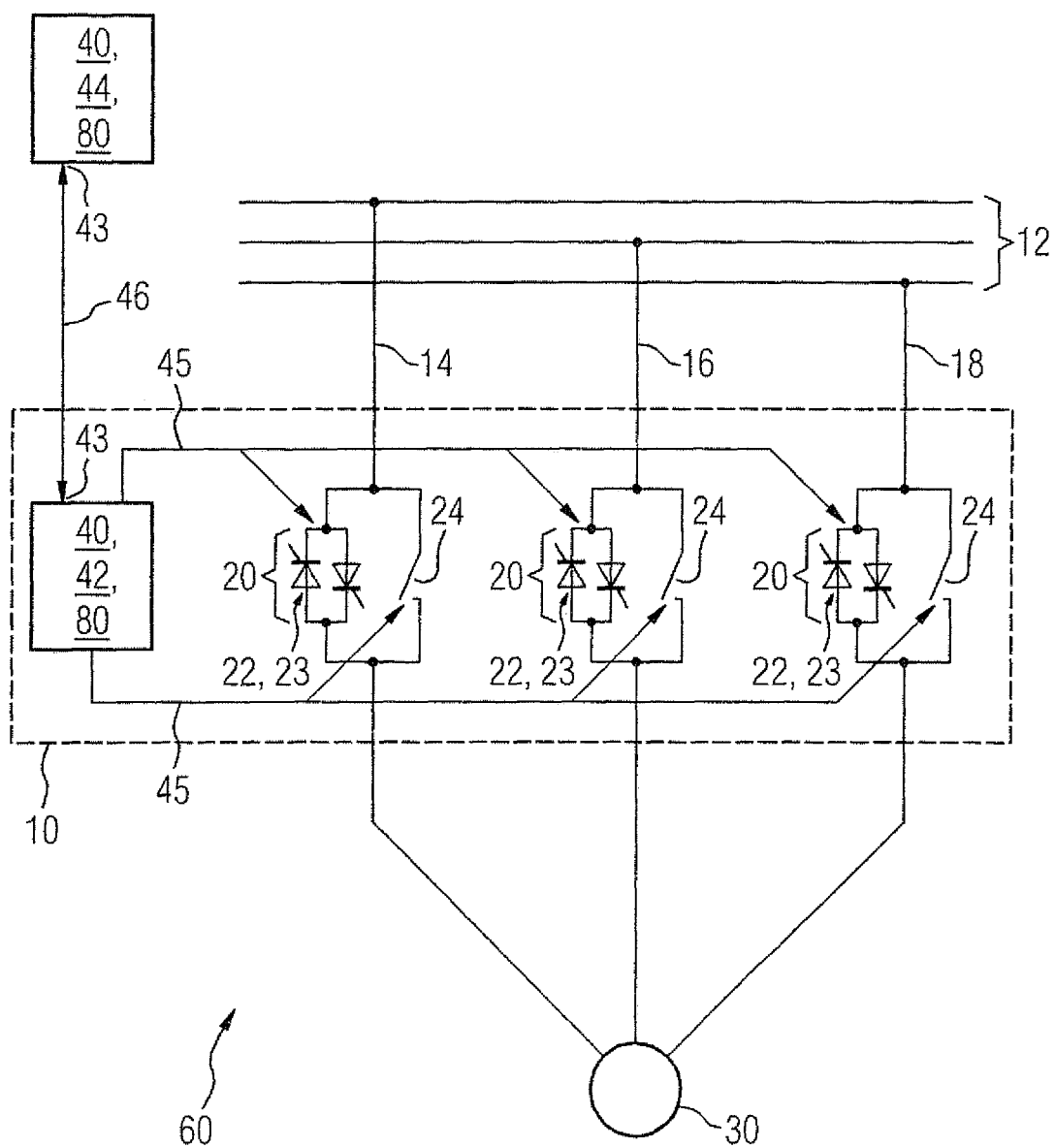
FIG. 1 is a circuit diagram of one embodiment of a motor starter arrangement according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic circuit diagram of an embodiment of a motor starter arrangement according to the present invention, generally designated by reference numeral 60 and including a motor starter 10. The motor starter 10 is connected to a power supply 12 that drives an electric motor 30. The power supply 12 has three phases 14, 16, 18, each leading to the electric motor 30. In each of the phases 14, 16, 18, a bypass circuit 20 is arranged comprising in each case a semiconductor switch 22 and an electromechanical switch 24. Herein, the semiconductor switch 22 is embodied as an antiparallel pair of thyristors 23. The semiconductor switches 22 are in each case attached parallel to the electromechanical switches 24 so that they bridge one another. A current flow through one of the phases 14, 16, 18 is interrupted when the electromechanical switch 24 and the semiconductor switch 22 are open. Herein at least one of the bypass circuits 20 is embodied according to FIG. 2. The motor starter 10 also includes a control unit 40, which is embodied as an internal control unit 42 suitable to output actuation commands 45 to the semiconductor switch 22 and the electromechanical switch 24. The actuation commands 45 to the thyristors 23 of the semiconductor switch 22 are embodied as ignition commands which cause the corresponding thyristor 23 to become conducting until the next voltage zero of the corresponding phase 14, 16, 18. The control unit 40 and the semiconductor switch 22 are embodied to cause the electric motor 30 to start up and brake in a targeted way via a phase-fired controller. Stored in the internal control unit 42 is a computer program product 80, which is executed during the operation of the motor starter 10. The internal control unit 42 has a data interface 43 that establishes a data connection 46 to a data interface 43 of a higher-ranking control system 44. Also stored in the higher-ranking control system 44 is a computer program product 80 that can be executed. The computer program products 80 in the internal control unit 42 and the higher-ranking control system 44 are in communicative connection via the data connection 46 during the operation of the motor starter 10. The operation of the motor starter 10 is controlled and/or regulated by the interaction of the computer program products 80 in the internal control unit 40 and the higher-ranking control system 44. Hence, the internal control unit 42 and the higher-ranking control system 40 interact as a control unit 40. As a result, an operating method 100 as outlined in FIG. 3, FIG. 4 and FIG. 5 is implemented.

Figure 2:
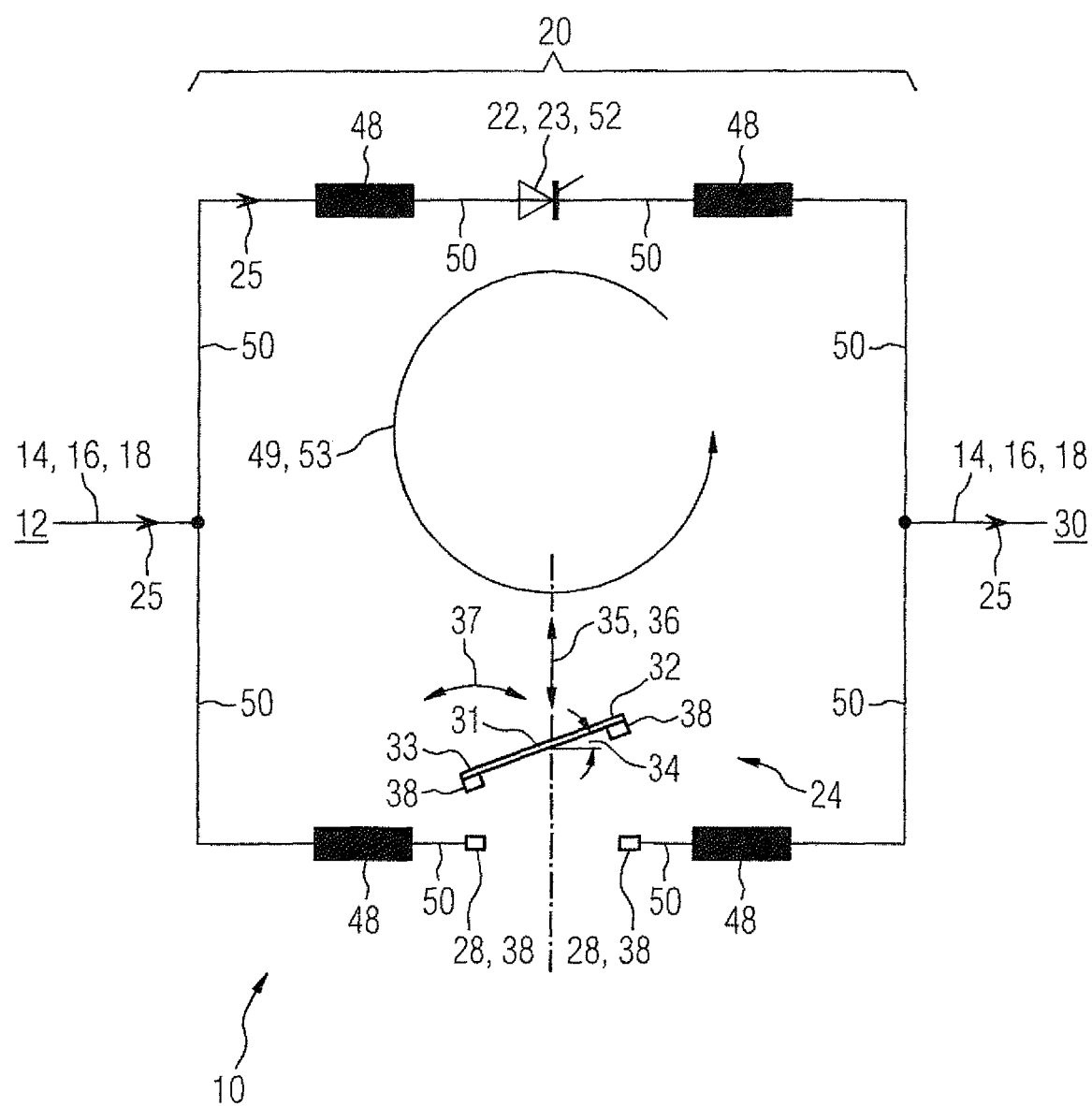
FIG. 2 is a schematic illustration of one embodiment of a bypass circuit in a motor starter according to the present invention.

FIG. 2 shows a schematic view of the structure of a bypass circuit 20, which is connected to a current-carrying phase 14, 16, 18 and a establishes a connection between a power supply 12 and an electric motor 30. The bypass circuit 20 includes a thyristor 23 that belongs to a pair of thyristors, which is not depicted in further detail, which serves as a semiconductor switch 22. An electromechanical switch 24 is arranged parallel to the thyristor 23. Inductances 48, which interact as a commutation inductance 49, are depicted in series before and after the semiconductor switch 22 and the electromechanical switch 24. Thus, the structure in FIG. 2 forms a commutation circuit 53. The individual inductances 48 depend on the length of the conductors 50 connecting the semiconductor switch 22 and the electromechanical switch 24. The commutation inductance 49 influences the height of a current gradient 52 in the semiconductor switch 22 when the current flow 25 is commutated through the phase 14, 16, 18 from the electromechanical switch 24 to the semiconductor switch 22.

The electromechanical switch 24 includes two opposite stationary contacts 28, which can be connected to one another in an electrically conductive manner via a switching piece. According to FIG. 2, the switching piece 31 is in an open position and adopts a maximum tilt angle 34. The switching piece 31 includes a first and a second end 32, 33, each of which has a contact piece 38. Accordingly, the stationary contacts 28 also have contact pieces 38, which, in closed state, are in contact with the contact pieces 38 of the switching piece 31. The switching piece 31 can be moved by an electromagnetically operated mechanism 36, which is not depicted in further detail, along an actuation direction 35. The switching piece 31 is embodied as tiltable so that on an opening of the electromechanical switch 24, first, the first end 32 of the switching piece 31 is detached from the associated stationary contact 28. Simultaneously, the second end 33 of the switching piece 31 initially remains in contact with its associated stationary contact 28. On an opening, the switching piece 31 executes a tilting movement 37 resulting from the design of the switching piece 31. The switching piece 31 is depicted from this viewpoint in more detail in FIG. 3.

FIG. 3 shows a schematic view of the more detailed structure of an electromechanical switch 24 that can be used in a bypass circuit 20 according to FIG. 2. The electromechanical switch 24 is shown in FIG. 3 during a first step 110, which should be interpreted as the starting state of an embodiment of the operating method according to the invention 100. In the first step 110, a current flow 25 through the associated phase 14, 16, 18 is substantially entirely conducted through the electromechanical switch 24. The switching piece 31, which is provided on a first and a second end 32, 33 with contact pieces 38 is in electrically conductive contact with stationary contacts 28, which are in turn provided with contact pieces 38. The switching piece 31 is connected tiltably to a switching-piece carrier 39, which can be moved via an electromagnetically operated mechanism 36, which is not shown in more detail. Furthermore, the switching-piece carrier 39 is connected via a spring element 41 to the switching piece 31. The spring force exerted by the spring element 41 supports at least one tilting action to be performed by the switching piece 31 on an actuation. In FIG. 3, the electromagnetically operated mechanism 36, which is not shown in further detail, is completely tightened so that the spring element 41 is loaded by the switching-piece carrier 39 and the switching piece 39 is pressed onto stationary contacts 28.

FIG. 4 shows the structure of the electromechanical switch 24 in a state that, during the operating method according to the invention 100, follows the state shown in FIG. 3 substantially directly. Herein, in the operating method according to the invention 100, a second step 120 is performed and a third step 130 is initiated. The second step 120 involves a closing of the semiconductor switch 22, which is not shown in further detail, and the third step 130 the opening of the electromechanical switch 24. In FIG. 3 and FIG. 4, same reference numbers have same technical meaning. According to FIG. 4, the electromagnetically operated mechanism 36 is actuated such that the switching-piece carrier 39 strikes the switching piece 31. The switching-piece carrier 39 includes an inclined stop 56 at an end facing the switching piece 31. One end of the inclined stop 56 includes a contact edge 57 that is suitable, during movement along the actuation direction 35, to give rise to a tilting movement 37 of the switching piece 31. According to FIG. 4, the detachment of the first end 32 of the switching piece 31 from the associated stationary contact 28 takes place substantially directly beforehand.

FIG. 5 shows the electromechanical switch 24 according to FIG. 3 and FIG. 4 during a third step 130 of the claimed operating method 100. FIG. 3, FIG. 4 and FIG. 5 should be interpreted as being mutually complementary. The same reference numbers also have the same technical meaning. The switching piece 31 is coupled tiltably via the switching-piece carrier 39 to the electromagnetically operated mechanism 36 which gives rise to movement of the switching piece 31 along an actuation direction 35. Herein, the switching piece 31 is preloaded by the spring element 41 such that a tilting movement 37 of the switching piece 31 is simultaneously effected. On the tilting movement 37, the tilt angle 34 is enlarged until a maximum tilt angle 34 is reached. The contact with the stationary contact 28 is first detached at a first end 32 of the switching piece 31. Simultaneously, the second end 33 of the switching piece remains in contact with the associated stationary contact 28. In the meantime, there is an arc voltage 47 between the first end 32 of the switching piece 31 and the associated stationary contact 28. As a result of the detachment of the switching piece 31 due to the execution of the tilting movement 37, an arc voltage 47 is only applied to one, namely the first, end 32 of the switching piece 31, and effects commutation to the parallel semiconductor switch 22, which is not shown in further detail. Hence, the tilting movement results in a reduced arc voltage and a reduced current gradient 52 in the assigned parallel semiconductor switch 22. In the further course of the movement of the switching piece 31 along the actuation direction, the second end 33 of the switching piece 31 is also detached from the associated stationary contact. Since the current commutation is finished at this time, the opening of the second end is always current-free and hence arc-free. This enables a more cost-effective material to be used for contact piece 38 at the second end 33 of the switching piece 31 than for the contact piece 38 of the first end 32.

FIG. 6 shows the electromechanical switch 24 in an open state that follows the third step 130 outlined in FIG. 5. Herein, the movement along the actuation direction 35 is completed and the switching piece 31 is detached from the associated stationary contacts 28 at both ends 32, 33. Commutation to the semiconductor switch 22, which is not shown in further detail, is completed so that a final state 200 for the claimed operating method 100 is established for the electromechanical switch 24.

FIG. 7 shows schematic diagrams 70.1, 70.2, 70.3 of the course of an embodiment of the operating method according to the invention 100 in. Each diagram 70.1, 70.2, 70.3 has a horizontal time axis 72 and a vertical value axis 74. A first diagram 70.1 depicts electric current intensities 75 on the value axis 74. The second diagram 70.2 shows a voltage between a first end 32 of the switching piece 31 and the associated stationary contact 28 on the value axis 74. This depicts an arc voltage 47. The third diagram 70.3 shows a contact state 73 for the two ends 32, 33 of the switching piece 31 on the value axis 74. Herein, a high state 71 is an open state in which the corresponding end 32, 33 of the switching piece 31 is detached from the associated stationary contact 28. A low state 27 in turn depicts a state in which the corresponding end 32, 33 of the switching piece 31 is in contact with the corresponding stationary contact 28.

In a starting state, which corresponds to a first step 110 of the operating method 100, the bypass current intensity 76 present in the electromechanical switch 24 corresponds to a current flow 25 present in the corresponding phase 14, 16, 18. The electromechanical switch 24 is closed and the semiconductor switch 22 open. The current intensity 77 in the semiconductor switch 22 is substantially zero during the first step 110. Similarly, the arc voltage 47 between the first end 32 of the switching piece 31 and the associated stationary contact 28 is also zero. In the meantime, both ends 32, 33 of the switching piece 31 are in contact with the corresponding stationary contact 28 and have a low state 27 as a contact state 73. This is followed by a second step 120, in which the semiconductor switch 22 becomes conducting, i.e. is closed.

In a third step 130, due to activation of the magnetically operated mechanism 36, which is not shown in further detail, the switching piece 31 is moved along an actuation direction 35. The switching piece 31 executes a tilting movement 37 so that the first end 32 of the switching piece 31 is detached from the associated stationary contact 28. Simultaneously, the second end 33 of the switching piece 31 further comes into contact with the associated stationary contact 28. Accordingly, the first end 32 of the switching piece 31 has a high state 71 as a contact state 73 and the second end 33 a low state 27.

Herein, there is an increase in the arc voltage 47 between the first end 32 of the switching piece 31 and the associated stationary contact 28. The arc voltage 47 adopts hereby a maximum value 51 and serves as a commutation voltage. The arc voltage 47 causes the bypass current intensity 76 present the in the electromechanical switch 24 to drop during the third step 130. The current intensity 77 in the semiconductor switch 22 increases to the same degree. The degree of the increase is shown in diagram 70.1 as an angle corresponding to the current gradient 52 in the semiconductor switch 22. The amount of the drop in the bypass-current intensity 76 in the electromechanical switch 24 corresponds to the current gradient 52 in the semiconductor switch 22. During the third step 130, the sum of the bypass-current intensity 76 and the current intensity 77 in the semiconductor switch 22 corresponds to the current flow 25 through the corresponding phase 14, 16, 18.

After the expiry of a commutation period 29, the current intensity 77 in the semiconductor switch 22 corresponds to the current flow 25 through the corresponding phase 14, 16, 18. After the expiry of the commutation period 26, The bypass-current intensity 76 is substantially zero. The third step 130 ends after the expiry of the actuation period 29 that exceeds the commutation period 26. After the expiry of the actuation period 29, the second end 33 of the switching piece 31 is also detached from the associated stationary contact 28 and has a high state 71 as a contact state 73. On the detachment of the second end 33 of the switching piece 31 from the corresponding stationary contact 28, a final state 200 of the operating method 100 is reached.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A motor starter for operating an electric motor connected to a multiphase power supply, said motor starter comprising:
   a semiconductor switch arranged in a current-carrying phase of the multiphase power supply; and
   an electromechanical switch arranged in parallel relation to the semiconductor switch in the current-carrying phase, said electromechanical switch comprising a movable switching piece configured tiltable to reduce a current gradient in the semiconductor switch.

2. The motor starter of claim 1, wherein the electromechanical switch is configured such that the current gradient in the semiconductor switch is reduced, when the electromechanical switch opens.

3. The motor starter of claim 1, wherein the electromechanical switch includes stationary contacts, said switching piece having first and second ends interacting with the stationary contacts, respectively, such that, when the electromechanical switch opens, an actuation period is defined between a detachment of the first end from the one of the stationary contacts and a detachment of the second end from the other one of the stationary contacts, which actuation period exceeds a commutation period for the semiconductor switch.

4. The motor starter of claim 3, wherein the electromechanical switch comprises a movable switching-piece carrier including an inclined stop for allowing tilting of the switching piece.

5. The motor starter of claim 4, wherein the switching-piece carrier is configured to enable adjustment of the actuation period as a function of an actuation velocity of the switching-piece carrier and/or a maximum tilt angle of the switching piece.

6. The motor starter of claim 3, wherein at least one member selected from the group consisting of the second end of the switching piece and the other one of the stationary contacts has arranged thereon a contact piece which is made of copper or a copper alloy.

7. The motor starter of claim 6, wherein the at least one member is made of copper and/or a copper alloy.

8. The motor starter of claim 1, wherein the electromechanical switch comprises a movable switching-piece carrier and a spring element to connect the movable switching-piece carrier to the switching piece and to tiltably preload the switching piece.

9. The motor starter of claim 1, wherein the electromechanical switch comprises a movable switching-piece carrier, said switching piece being connected in an eccentrically tiltable manner to the switching-piece carrier.

10. The motor starter of claim 1, further comprising a wall having a projection for unilateral support of the switching piece.

11. The motor starter of claim 1, wherein the electromechanical switch and the semiconductor switch form a commutation circuit with an inductance of 20 nH to 150 μH.

12. The motor starter of claim 1, wherein the electromechanical switch and the semiconductor switch form a commutation circuit with an inductance of 30 nH to 130 nH.

13. A method of operating a motor starter including an electromechanical switch and a parallel semiconductor switch in a current-carrying phase of a multiphase power supply, said method comprising:
   in an operating state closing the electromechanical switch and opening the semiconductor switch;
   closing the semiconductor switch; and
   opening the electromechanical switch by detaching a first and a second end of a switching piece of the electromechanical switch from assigned stationary contacts, thereby reducing a current gradient in the semiconductor switch as a result of a tilting movement of the switching piece.

14. The method of claim 13, wherein an actuation period passing between detachment of the first and second ends of the switching piece from the assigned stationary contacts exceeds a commutation period for the semiconductor switch.

15. The method of claim 14, further comprising:
   tiltably connecting a switching-piece carrier of the electromechanical switch to the switching piece; and
   specifying the actuation period as a function of an actuation velocity of the switching-piece carrier and/or a maximum tilt angle of the switching piece.

16. A computer program product embodied in a non-transitory computer readable medium, wherein the computer program, when loaded into a control unit and executed by the control unit, causes the control unit device to output an actuation command to a semiconductor switch and an electromechanical switch of a motor starter and to perform the steps of:
   in an operating state closing the electromechanical switch and opening the semiconductor switch;
   closing the semiconductor switch; and
   opening the electromechanical switch by detaching a first and a second end of a switching piece of the electromechanical switch from assigned stationary contacts, thereby reducing a current gradient in the semiconductor switch as a result of a tilting movement of the switching piece.

17. The computer program product of claim 16, configured to set a starting current of the electromechanical switch.

18. A motor arrangement, comprising:
   a multiphase power supply;
   a motor starter connected to the multiphase power supply, said motor starter comprising a semiconductor switch arranged in a current-carrying phase of the multiphase power supply, and an electromechanical switch arranged in parallel relation to the semiconductor switch in the current-carrying phase, said electromechanical switch comprising a movable switching piece configured tiltable to reduce a current gradient in the semiconductor switch; and
   an electric motor coupled to the multiphase power supply via the motor starter.

* * * * *